United States Patent
Zhu et al.

(10) Patent No.: US 12,265,642 B2
(45) Date of Patent: Apr. 1, 2025

(54) DATA ENCRYPTION OR DECRYPTION METHOD, APPARATUS, AND SYSTEM

(71) Applicant: Huawei Technologies Co., Ltd., Shenzhen (CN)

(72) Inventors: Mingming Zhu, Hangzhou (CN); Zhongkai Yang, Hangzhou (CN); Shiping Deng, Hangzhou (CN); Weiyan Zheng, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 189 days.

(21) Appl. No.: 18/062,944

(22) Filed: Dec. 7, 2022

(65) Prior Publication Data
US 2023/0102374 A1 Mar. 30, 2023

Related U.S. Application Data

(63) Continuation of application No. PCT/CN2021/088551, filed on Apr. 21, 2021.

(30) Foreign Application Priority Data

Jun. 8, 2020 (CN) .......................... 202010514307.9
Dec. 9, 2020 (CN) .......................... 202011426126.7

(51) Int. Cl.
H04L 29/06 (2006.01)
G06F 21/60 (2013.01)
G06F 21/62 (2013.01)

(52) U.S. Cl.
CPC ........ *G06F 21/6218* (2013.01); *G06F 21/602* (2013.01)

(58) Field of Classification Search
CPC .......................... G06F 21/6218; G06F 21/602
See application file for complete search history.

(56) References Cited

U.S. PATENT DOCUMENTS

| | | | |
|---|---|---|---|
| 7,218,733 B2 * | 5/2007 | Li | H04L 9/065 380/28 |
| 2006/0034459 A1 * | 2/2006 | Uchikawa | G06F 21/6209 380/255 |
| 2016/0140349 A1 | 5/2016 | Brown | |
| 2017/0005797 A1 * | 1/2017 | Lane | H04L 63/20 |
| 2020/0184086 A1 * | 6/2020 | Bishop | H04L 9/0861 |

FOREIGN PATENT DOCUMENTS

| | | |
|---|---|---|
| CN | 104038339 A | 9/2014 |
| CN | 104735457 A | 6/2015 |
| CN | 111103856 A | 5/2020 |

OTHER PUBLICATIONS

Brecht, Daniel. Tales from the Crypt: Hardware vs Software. Magazine Feature Jun. 23, 2015. pp. 1-12.*
Brecht Reference. (Year: 2015).*

* cited by examiner

*Primary Examiner* — Jason K Gee
(74) *Attorney, Agent, or Firm* — Conley Rose, P.C.

(57) ABSTRACT

A data encryption or decryption method includes obtaining a data processing request carrying to-be-processed data; selecting one of a first processing manner and a second processing manner as a processing manner for the to-be-processed data. In the first processing manner, processing is performed by an encryption/decryption chip. In the second processing manner, processing is performed by a software program running on a central processing unit.

20 Claims, 9 Drawing Sheets

DATA ENCRYPTION OR DECRYPTION METHOD, APPARATUS, AND SYSTEM

CROSS-REFERENCE TO RELATED APPLICATIONS

This application is a continuation of International Patent Application No. PCT/CN2021/088551, filed on Apr. 21, 2021, which claims priority to Chinese Patent Application No. 202011426126.7, filed on Dec. 9, 2020 and Chinese Patent Application No. 202010514307.9, filed on Jun. 8, 2020, all of which are hereby incorporated by reference in their entireties.

TECHNICAL FIELD

The present disclosure relates to the computer field, and in particular, to a data encryption or decryption method, apparatus, and system.

BACKGROUND

With development of a big data era, increasing attention is paid to data security in infrastructure, and data encryption is a top priority of data security. Generally, data encryption is implemented by using a specified software code library. For example, data encryption is implemented by using an OpenSSL. Accordingly, a receive end that receives encrypted data performs a decryption operation based on the open secure sockets layer. In a specific implementation, to-be-encrypted or to-be-decrypted data includes data for executing instructions or transferring messages, and the data may include a plurality of types. For example, the data is stream mode data that includes a plurality of data blocks. A central processing unit (CPU) may sequentially complete encryption or decryption of data in each data block in the stream mode by using a specified software program or process, and store encrypted or decrypted data into a specified address, so that a transmit end that sends encrypted or decrypted data obtains an encryption or decryption result of the data. However, when there is a large amount of to-be-encrypted or to-be-decrypted data, a processing capability of the CPU cannot meet a data encryption or decryption delay requirement. Consequently, data processing efficiency is affected. Therefore, how to provide an efficient data processing method becomes an urgent technical problem to be resolved.

SUMMARY

This application provides a data encryption or decryption method, apparatus, and system, and a computer-readable storage medium, to reduce a delay generated when an encryption or decryption operation is performed on data and improve data processing efficiency.

According to a first aspect, a data encryption or decryption method is provided, where a data processing request is first obtained. One of a first processing manner and a second processing manner is selected as a processing manner for to-be-processed data, and an encryption or decryption operation is performed on the to-be-processed data in the selected processing manner. The data processing request includes the to-be-processed data. In the first processing manner, processing is performed by an encryption/decryption chip, and in the second processing manner, processing is performed by a software program running on a central processing unit.

According to the foregoing method, a data encryption or decryption system supports two data encryption or decryption manners.

One processing manner may be selected based on a data processing request, to complete an encryption or decryption operation performed on the to-be-processed data. In this way, it is ensured that different data processing requests can be encrypted or decrypted in a more efficient manner, and data processing efficiency is improved.

In a possible implementation, the processing manner of the to-be-processed data is selected based on a size of the to-be-processed data and a first parameter, where the first parameter includes an encryption or decryption delay generated when a data block of a unit length is processed. It can be learned from the description for the foregoing method that the processing manner may be selected based on the size of the to-be-processed data and an encryption or decryption delay generated when a data block of a unit length is processed, so that a more efficient processing manner is selected to encrypt or decrypt the to-be-processed data, to reduce a data processing delay.

In another possible implementation, a first processing delay and a second processing delay are obtained, through prediction, based on the size of the to-be-processed data and the first parameter. The first parameter includes a processing delay generated when the data block of a unit length is processed in the first processing manner and a processing delay generated when the data block of a unit length is processed in the second processing manner, the first processing delay is a processing delay generated when the to-be-processed data is processed in the first processing manner, and the second processing delay is a processing delay generated when the to-be-processed data is processed in the second processing manner. The processing manner is selected based on a result of comparison between the first processing delay and the second processing delay. It can be learned from the description for the foregoing method that processing delays generated in the two processing manners may be predicted, a difference between the processing delays generated in the two processing manners is further compared, and one of the processing manners that matches the data processing request is selected to perform an encryption or decryption operation on the to-be-processed data, to improve data processing efficiency of the system.

In another possible implementation, the processing manner of the to-be-processed data is selected based on the size of the to-be-processed data. It can be learned from the description for the foregoing method that the processing manner may alternatively be directly selected based on the size of the to-be-processed data, to ensure that a large data block can be processed in a hardware encryption/decryption manner. In this way, computing power of a hardware encryption/decryption chip is fully utilized, and a processing speed of the hardware encryption/decryption manner is further improved.

In another possible implementation, the first processing manner is selected when the size of the to-be-processed data is greater than a preset size threshold; or the second processing manner is selected when the size of the to-be-processed data is less than or equal to a preset size threshold. It can be learned from the description for the foregoing method that the processing manner may be directly selected based on the size of the to-be-processed data, so that a processing capability of the encryption/decryption chip is fully utilized, and overall processing efficiency of the system is improved.

In another possible implementation, the to-be-processed data is fragmented, and the encryption or decryption operation is separately performed on different fragments by using a plurality of processor cores in the encryption/decryption chip. It can be learned from the description for the foregoing method that, in the hardware encryption/decryption manner, the to-be-processed data may be further fragmented, and then the plurality of processor cores in the encryption/decryption chip are used to perform encryption or decryption operations on the fragments in parallel. In this way, computing power of the hardware encryption/decryption chip is maximized and data encryption or decryption efficiency is improved.

In another possible implementation, a manner in which the to-be-processed data is fragmented includes: fragmenting the to-be-processed data based on a hardware processing capability of the encryption/decryption chip. It can be learned from the description for the foregoing method that, in the fragmentation manner, fragmentation may be performed based on the processing capability of the encryption/decryption chip, so that the plurality of processor cores in the encryption/decryption chip can perform encryption or decryption operations on a plurality of fragments in parallel, to improve a data encryption or decryption speed and reduce a data processing delay.

In another possible implementation, a manner in which the to-be-processed data is fragmented includes: determining a quantity of fragments based on the size of the to-be-processed data, a quantity of processor cores in the encryption/decryption chip, a quantity of data channels, and a processing delay generated when each processor core processes a data block of a unit length; and fragmenting the to-be-processed data based on the determined quantity of fragments, to obtain two or more fragments. It can be learned from the description for the foregoing method that the hardware processing capability of the encryption/decryption chip includes the quantity of the processor cores, the quantity of the data channels, and the processing delay generated when each processor core processes a data block of a unit length. A quantity of fragments may be determined by combining the size of the to-be-processed data and the foregoing factors, so that a hardware offloading capability of the encryption/decryption chip is fully utilized, and data processing efficiency of the system is accelerated.

In another possible implementation, a first processor core set is selected from the plurality of processor cores in the encryption/decryption chip, where a quantity of processor cores in the first processor core set is greater than or equal to a quantity of the fragments obtained by fragmenting the to-be-processed data. The two or more fragments are sent to processor cores in the first processor core set, so that each processor core in the first processor core set separately performs an encryption or decryption operation on different fragments in the two or more fragments. In this way, that the plurality of processor cores perform encryption or decryption operations on different fragments in parallel is implemented, the hardware offloading capability is further improved, and data processing efficiency is improved.

In another possible implementation, encryption results of all the fragments of the to-be-processed data are sorted according to a sequence of the fragments, to obtain an encryption result of the to-be-processed data. In this way, it is ensured that the encryption results of the data fragments of the to-be-processed data can be sorted according to a fragmentation sequence, to ensure accuracy of the encryption result of the to-be-processed data.

According to a second aspect, this application provides a data encryption or decryption method, where an encryption/decryption request is obtained. When a preset condition is met, a first processing manner is selected to perform an encryption or decryption operation on to-be-processed data. The data processing request includes the to-be-processed data, and in the first processing manner, processing is performed by an encryption or decryption chip. It can be learned from the foregoing content that this application provides two data encryption or decryption manners. A processing manner may be selected based on a to-be-processed request, to perform an encryption or decryption operation. In this way, a hardware offloading capability is provided, computing power of an encryption/decryption chip is maximized, and data processing efficiency is improved.

In a possible implementation, the first processing manner is selected based on a size of the to-be-processed data and a first parameter, to perform an encryption or decryption operation on the to-be-processed data. The first parameter includes an encryption or decryption delay generated when a data block of a unit length is processed. It can be learned from the description for the foregoing method that the processing manner of the to-be-processed data may be selected based on the size of the to-be-processed data and an encryption or decryption delay generated when a data block of a unit length is processed, so that a more efficient processing manner is selected to encrypt or decrypt the to-be-processed data, to reduce a data processing delay.

In another possible implementation, a first processing delay and a second processing delay are obtained, through prediction, based on the size of the to-be-processed data and the first parameter. The first parameter includes a processing delay generated when the data block of a unit length is processed in the first processing manner and a processing delay generated when the data block of a unit length is processed in the second processing manner, the first processing delay is a processing delay generated when the to-be-processed data is processed in the first processing manner, and the second processing delay is a processing delay generated when the to-be-processed data is processed in the second processing manner. The processing manner is selected based on a result of comparison between the first processing delay and the second processing delay. It can be learned from the description for the foregoing method that processing delays generated in the two processing manners may be predicted, a difference between the processing delays generated in the two processing manners is further compared, and one of the processing manners is selected as the processing manner of the to-be-processed data, to improve data processing efficiency of the system.

In another possible implementation, the processing manner of the to-be-processed data is selected based on the size of the to-be-processed data.

In another possible implementation, the first processing manner is selected when the size of the to-be-processed data is greater than a preset size threshold; or the second processing manner is selected when the size of the to-be-processed data is less than or equal to a preset size threshold. In the second processing manner, processing is performed by a software program running on a central processing unit. It can be learned from the description for the foregoing method that the processing manner may alternatively be directly selected based on the size of the to-be-processed data, so that a processing capability of the encryption/decryption chip is fully utilized, and overall processing efficiency of the system is improved.

In another possible implementation, the to-be-processed data is fragmented, and the encryption or decryption operation is separately performed on different fragments by using a plurality of processor cores in the encryption/decryption chip. It can be learned from the description for the foregoing method that, in the hardware encryption/decryption manner, the to-be-processed data may be further fragmented, and then the plurality of processor cores in the encryption/decryption chip are used to perform encryption or decryption operations on the fragments in parallel. In this way, computing power of the hardware encryption/decryption chip is maximized and data encryption or decryption efficiency is improved.

In another possible implementation, a quantity of fragments is determined based on the size of the to-be-processed data and a processing capability of a hardware encryption/decryption engine. The to-be-processed data is fragmented based on the determined quantity of fragments, to obtain two or more fragments. It can be learned from the description for the foregoing method that, in the fragmentation manner, fragmentation may be performed based on the processing capability of the encryption/decryption chip, so that the plurality of processor cores in the encryption/decryption chip can perform encryption or decryption operations on a plurality of fragments in parallel, to improve a data encryption or decryption speed and reduce a data processing delay.

In another possible implementation, the to-be-processed data may be fragmented in the following manner. The manner includes: fragmenting the to-be-processed data based on a quantity of the processor cores in the encryption/decryption chip, a quantity of data channels, and a processing delay generated when each processor core processes data of a unit length. It can be learned from the description for the foregoing method that the hardware processing capability of the encryption/decryption chip includes the quantity of the processor cores, the quantity of the data channels, and the processing delay generated when each processor core processes a data block of a unit length. A quantity of fragments may be determined by combining the size of the to-be-processed data and the foregoing factors, so that a hardware offloading capability of the encryption/decryption chip is fully utilized, and data processing efficiency of the system is accelerated.

In another possible implementation, a first processor core set is selected from the plurality of processor cores in the encryption/decryption chip, where a quantity of processor cores in the first processor core set is greater than or equal to a quantity of the fragments obtained by fragmenting the to-be-processed data. The two or more fragments are sent to processor cores in the first processor core set, so that each processor core in the first processor core set separately performs an encryption or decryption operation on different fragments in the two or more fragments. In this way, that the plurality of processor cores perform encryption or decryption operations on different fragments in parallel is implemented, and the hardware offloading capability is further improved.

In another possible implementation, encryption results of all the fragments of the to-be-processed data are sorted according to a sequence of the fragments, to obtain an encryption result of the to-be-processed data. In this way, it is ensured that the encryption results of the data fragments of the to-be-processed data can be sorted according to a fragmentation sequence, to ensure accuracy of the encryption result of the to-be-processed data.

According to a third aspect, this application provides a data encryption or decryption apparatus. The apparatus includes modules configured to perform the data encryption or decryption method in the first aspect or any possible implementation of the first aspect and the second aspect or any possible implementation of the second aspect.

According to a fourth aspect, this application provides a data encryption or decryption system, where the system includes a central processing unit and a hardware encryption/decryption chip. The system is configured to perform the operation steps of the data encryption or decryption method in the first aspect or any possible implementation of the first aspect and the second aspect or any possible implementation of the second aspect.

According to a fifth aspect, this application provides a computer-readable storage medium. The computer-readable storage medium stores computer instructions, and when the computer instructions are run on a computer, the computer is enabled to perform the operation steps of the methods according to the foregoing aspects.

According to a sixth aspect, a computer program product including instructions is provided. When the computer program product runs on a computer, the computer is enabled to perform the methods according to the foregoing aspects.

In this application, based on the implementations provided in the foregoing aspects, the implementations may be further combined to provide more implementations.

DESCRIPTION OF EMBODIMENTS

For ease of understanding, terms in this application are first explained.

A stream cipher, also referred to as data stream encryption, is a symmetric encryption/decryption (which may also be referred to as encryption or decryption) algorithm. Specifically, execution bodies that perform encryption or decryption use a same key. For example, a pseudo-random cipher digit stream (pseudo-random stream) is used as a key. An encryption execution body uses the key to encrypt to-be-encrypted data (also referred to as plaintext data), to obtain a result (which may also be referred to as ciphertext data) obtained after the to-be-encrypted data is encrypted. Correspondingly, after obtaining the ciphertext data, a decryption execution body may decrypt the ciphertext data by using the same key. For example, a symmetric encryption/decryption algorithm is block cipher. The encryption execution body may divide the plaintext data into a plurality of equal-length blocks (block), and encrypt each group by using a determined algorithm and a symmetric key. The decryption execution body may decrypt the ciphertext data into the plaintext data by using a same key. Block encryption is an extremely important encryption method. Typical block encryption algorithms include standard encryption algorithms that are approved by the United States government and that include a data encryption standard (DES) and an advanced encryption standard (AES). The typical block encryption algorithms are widely applied in scenarios such as email encryption and bank transaction. China State Cryptography Administration also releases a block encryption algorithm (also referred to as ShangMi or SM). The block encryption algorithm mainly includes SM1, SM2, SM3, and SM4, and is also widely applied in various fields.

Another term is a kernel mode. The kernel mode and a user mode are two running levels of an operating system. There are mainly two permission statuses: a core mode (also referred to as a pipe mode), also referred to as a privileged mode, and a user mode (also referred to as an eye mode). The core mode is a mode in which a kernel of the operating system runs. Code running in this mode can access system storage and an external device without limitation.

The user mode is a non-privileged state. The kernel of the operating system can prohibit code in this state from performing potentially dangerous operations, such as writing a system configuration file, terminating a process of another user, and restarting the system.

The following clearly describes technical solutions in embodiments of this application with reference to accompanying drawings in embodiments of this application.

Figure 1:
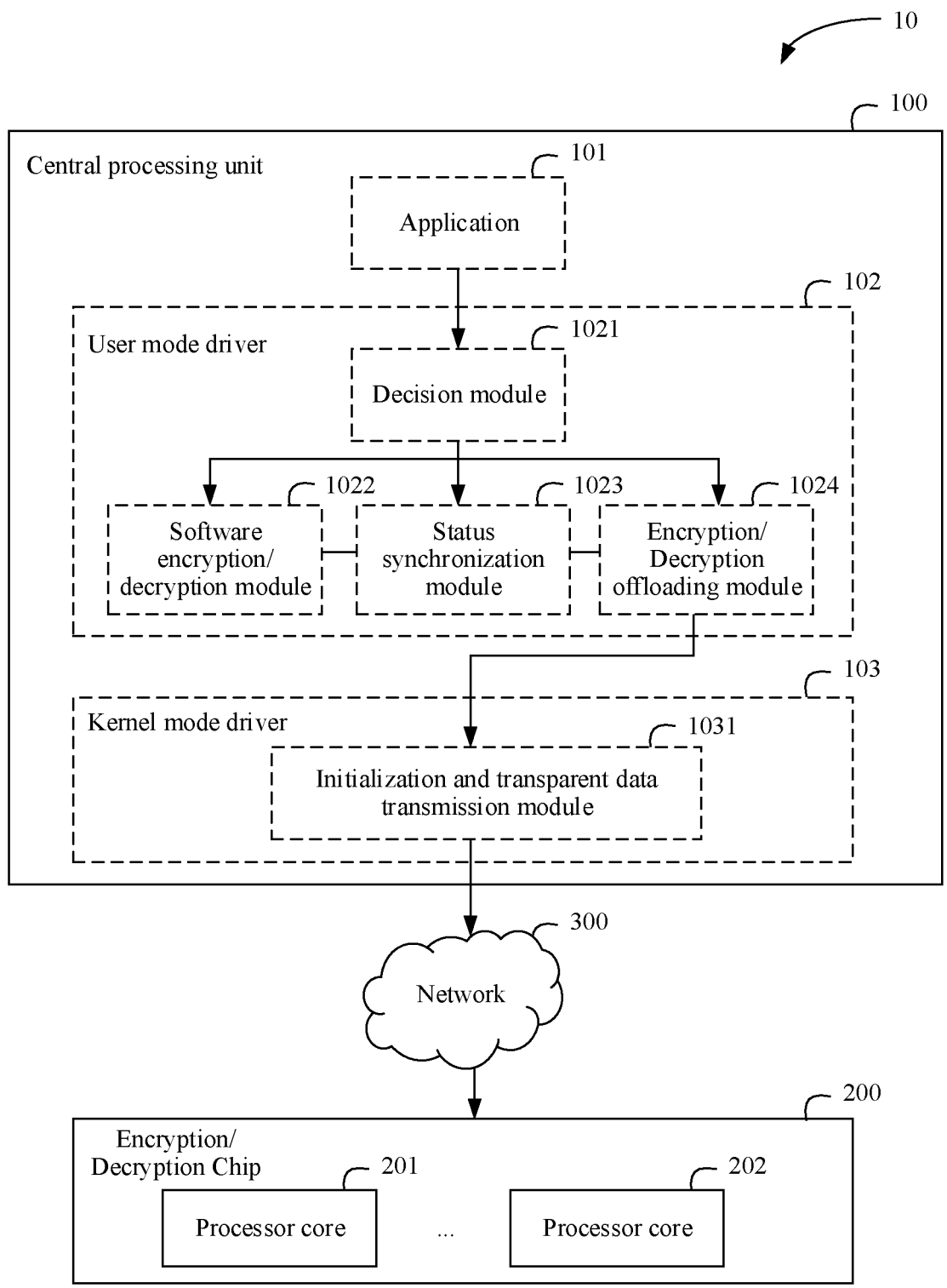
FIG. 1 is a schematic diagram of a logical structure of a data encryption or decryption system according to an embodiment of the present disclosure.

FIG. 1 is a diagram of a logical architecture of a data encryption or decryption system 10 according to an embodiment of this application. As shown in the figure, the system 10 includes a CPU 100 and an encryption/decryption chip 200. The central processing unit 100 and the encryption/decryption chip 200 are connected through a network 300. The network 300 may be a communication network inside a device, for example, a bus. Specifically, the bus may be a Peripheral Component Interconnect Express (PCIe) standard. In this case, the central processing unit 100 and the encryption/decryption chip 200 are located in a same device. The system 10 may be a device such as a computing device (for example, a server), a storage device (for example, a storage array), a network device (for example, a switch), or an intelligent device (for example, an intelligent terminal or an intelligent vehicle). Alternatively, the network 300 may be a communication network between devices, for example, a communication structure including Ethernet, a fiber channel (FC), InfiniBand, and the like. In this case, the central processing unit 100 and the encryption/decryption chip 200 are respectively located in different devices, and the system 10 may be a system including two or more devices.

It should be noted that the central processing unit 100 in the system shown in FIG. 1 may further be a processor of another type, for example, a digital signal processor (DSP), an application-specific integrated circuit (ASIC), a field-programmable gate array (FPGA) or another programmable logic device, a discrete gate or a transistor logic device, or a discrete hardware component. Alternatively, the central processing unit 100 may be a processor of another type such as a graphics processing unit (GPU) or a neural processing unit (NPU). For ease of description, a central processing unit is used as an example to further explain the data encryption or decryption method provided in this embodiment of this application.

Optionally, an operating system may further be run in the central processing unit 100.

The central processing unit 100 includes an application 101, a user mode driver 102, and a kernel mode driver 103.

The application 101 is a computer program (or referred to as program code) running in the central processing unit 100, and may generate a data processing request. The data processing request includes to-be-processed data. A same data processing request may include one or more data blocks. Data processing includes encryption or decryption. In addition, if the application 101 is an application that runs a streaming media scenario, the application 101 may further generate streaming (which may also be referred to as stream mode) data. For example, an application that runs a streaming media scenario is a video encryption application. In this case, the application 101 continuously generates to-be-processed data as a video record or a sent image changes, and the to-be-processed data is continuously generated in a form similar to a "stream". Optionally, a stream cipher may be used to perform an encryption or decryption operation on the data.

The user mode driver 102 and the kernel mode driver 103 are drivers that are run in the central processing unit 100 by the encryption/decryption chip 200 (which may also be referred to as an accelerator), and are configured to implement communication between the encryption/decryption chip 200 and the central processing unit 100. The user mode driver 102 and the kernel mode driver 103 are separately configured to implement special programs with different permissions at an operating system layer, and are equivalent to an interface of the encryption/decryption chip 200. The operating system may communicate with the encryption/decryption chip 200 through the interface.

The user mode driver 102 is configured to select a processing manner of to-be-processed data, and perform software encryption/decryption or hardware encryption/decryption based on the selected processing manner. For ease of description, a hardware encryption/decryption manner may alternatively be referred to as a first processing manner, and a software encryption/decryption manner may alternatively be referred to as a second processing manner. Specifically, the user mode driver 102 includes a decision module 1021, a software encryption/decryption module 1022, a status synchronization module 1023, and an encryption/decryption offloading module 1024. The decision module 1021 is configured to: select a processing manner of to-be-processed data, and indicate, based on the selected processing manner, the software encryption/decryption module 1022 or the encryption/decryption offloading module 1024 to perform an encryption or decryption operation on the to-be-processed data. In the software encryption/decryption manner, the software encryption/decryption module 1022 performs an encryption or decryption operation on the to-be-processed data. In the hardware encryption/decryption manner, the encryption/decryption offloading module 1024, the kernel mode driver 103, and the encryption/decryption chip 200 jointly complete an encryption or decryption operation on the to-be-processed data.

Further, an association relationship may exist between adjacent pieces of to-be-processed data in streaming data. For example, an encryption result of a previous piece of to-be-processed data is used as a part of a next piece of to-be-processed data. In this case, if the two adjacent pieces of to-be-processed data are separately encrypted or decrypted in different processing manners, the status synchronization module 1023 needs to be used to ensure that encryption or decryption operations can be performed on the pieces of to-be-processed data one by one according to a sequence of the pieces of to-be-processed data generated by the application. In this way, accuracy and correlation of a data processing process is ensured. Optionally, before performing the encryption or decryption operation on the current to-be-processed data, the software encryption/decryption module 1022 and the encryption/decryption offloading module 1024 may alternatively obtain a processing status of the streaming data from the status synchronization module 1023, to determine a relationship between the current to-be-processed data and data that is in the streaming data and on which encryption or decryption has been performed. After performing the encryption or decryption operation on the current to-be-processed data, the software encryption/decryption module 1022 and the encryption/decryption offloading module 1024 notify the status synchronization module 1023 that encryption or decryption has been performed on the data, to avoid affecting accuracy of a streaming data processing process.

Optionally, the status synchronization module 1023 and the decision module 1021 may alternatively be deployed together. In this case, in addition to implementing processing manner selection, the decision module 1021 is further configured to ensure accuracy and correlation of a data processing process.

The kernel mode driver 103 includes an initialization and transparent data transmission module 1031 that is configured to implement initialization processing performed on the encryption/decryption chip 200. The initialization processing includes the following process: In a system startup phase, the central processing unit 100 identifies a location (for example, a bus number in a PCIe bus) of the encryption/decryption chip 200 and a hardware configuration (for example, a quantity of processors included in the encryption/decryption chip, and a quantity of processor cores included in each processor) of the encryption/decryption chip 200, and applies for a hardware encryption/decryption resource for a hardware chip 200. In this way, the encryption/decryption chip 200 may be subsequently used to complete an encryption or decryption operation on to-be-processed data. The hardware encryption/decryption resource includes a queue (for example, a queue 105 in FIG. 5) used to implement storage, encryption or decryption, and a data buffer of to-be-processed data. The application 101 may store to-be-processed data in a data buffer of to-be-processed data, so that the decision module 1021 obtains the to-be-processed data, and further selects a processing manner to perform an encryption or decryption operation on the to-be-processed data. The queue 105 is a logical storage unit configured to store to-be-processed data or fragments of the to-be-processed data, and an encryption or decryption result of the to-be-processed data or each fragment of the to-be-processed data. In a specific implementation, in an initialization process, storage space (for example, a memory) accessible to the central processing unit 100 may be divided, to obtain a storage area of a preset size. The storage area is used to store to-be-processed data or fragmented data of the to-be-processed data when a hardware encryption/decryption manner is selected, and an encryption or decryption result of the to-be-processed data or the fragmented data of the to-be-processed data. Further, based on a type of data stored in the queue 105, the queue 105 may be further classified into a queue used to store fragmented data and a queue used to store encryption results of the fragmented data. The data buffer of to-be-processed data may be disposed in a memory accessible to the central processing unit. A size of the data buffer may be set based on a service requirement. This is not limited in this application.

It should be noted that a quantity of queues and a queue depth of each queue constitute no limitation on this application. In a specific implementation process, division may be performed based on a hardware processing capability of an encryption/decryption chip.

In addition, the initialization and transparent data transmission module 1031 is further configured to implement transparent data transmission in hardware encryption or decryption processing. Specifically, when an encryption or decryption operation is performed on to-be-processed data in the hardware encryption/decryption manner, the initialization and transparent data transmission module 1031 may migrate the to-be-processed data or fragments of the to-be-processed data from the queue 105 to a queue 106. Further, the encryption/decryption chip 200 performs the encryption or decryption operation. Then, an encryption or decryption result of the to-be-processed data is stored in the queue 106, and the initialization and transparent data transmission module 1031 migrates the encryption or decryption result of the to-be-processed data to the queue 105. When fragmentation processing is performed on the to-be-processed data, the encryption/decryption offloading module 1024 further needs to sort the fragments according to a fragmentation sequence. Finally, the decision module 1021 sends a processing result to the application 101.

It should be noted that data sharing may be implemented between the user mode driver 102 and the kernel mode driver 103 by using a transparent data transmission technology. In a specific implementation, in a system initialization phase, a storage (for example, a memory) accessible to the central processing unit may be divided in a memory-mapped input/output (MMIO) manner (which may also be referred to as an address mapping manner), to obtain storage space of a specified size. In addition, a mapping relationship is established between the storage space and storage space that is in the encryption/decryption chip 200 and that is accessible to the central processing unit 100, to implement address mapping between storage space of the memory and a storage (not shown in FIG. 1) of the encryption/decryption chip 200. In this way, data shared access between the central processing unit 100 and the encryption/decryption chip 200 is implemented. Alternatively, based on the foregoing used memory-mapped input/output technology, transparent data transmission is implemented in a direct memory access (DMA) manner, so that the encryption/decryption chip 200 can quickly obtain fragmented data of to-be-processed data. In this way, encryption and decryption operations are performed on the fragmented data by using processor cores (for example, a processor core 201 to a processor core 20$s$) in the encryption/decryption chip 200.

The encryption/decryption chip 200 (which may also be referred to as a hardware encryption/decryption engine, an encryption/decryption offloading card, or an encryption/decryption accelerator) is a dedicated data encryption or decryption chip, and is configured to perform function offloading on the software encryption/decryption manner executed by the central processing unit 100. In other words, when to-be-processed data is large, the encryption/decryption chip 200 replaces the central processing unit 100 to perform an encryption or decryption operation on the to-be-processed data, to implement function offloading of the data encryption or decryption operation. Specifically, a processor and a storage that are configured to perform data encryption or decryption may be disposed inside the encryption/decryption chip 200. Compared with that in the software encryption/decryption manner in which encryption and decryption processes need to be implemented by using a processor and an external memory of the processor, a processor inside the encryption/decryption chip 200 may directly access the storage. In this case, an access path is short, and a data processing speed is faster. In addition, a plurality of processors may be disposed in the encryption/decryption chip 200, and different processor cores in each processor may separately perform an encryption or decryption operation on to-be-processed data, so that efficiency is improved.

It should be noted that each module in the central processing unit 100 in the system shown in FIG. 1 is a type of software module, and a function of each module may be implemented by computer program code, or may be implemented by dedicated hardware.

Next, with reference to the system architecture shown in FIG. 1, the data encryption or decryption method provided in this application is further explained by using an example in which a data processing request is an encryption process for to-be-processed data. The method may be performed by the system shown in FIG. 1.

Figure 2:
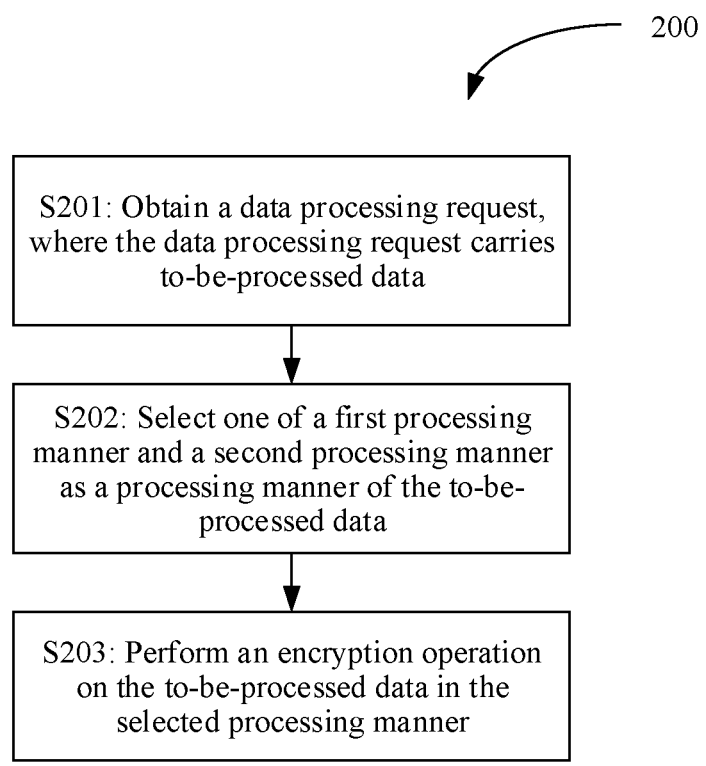
FIG. 2 is a schematic flowchart of a data encryption or decryption method according to an embodiment of the present disclosure.

FIG. 2 shows a data encryption or decryption method according to an embodiment of the present disclosure. As shown in the figure, the method includes the following steps.

S201: Obtain a data processing request, where the data processing request includes to-be-processed data.

The data processing request may be a data processing request generated by the application 101 that is run on the central processing unit 100 shown in FIG. 1. In this case, an operation of obtaining the data processing request may be performed by the central processing unit 100, and may be specifically performed by the decision module 1021 in the central processing unit 100. Alternatively, the data processing request may be a data processing request generated by an application that runs on another processor. In this case, an operation of obtaining the data processing request may be performed by the system 10, and may be specifically performed by the central processing unit 100 in the system. For ease of description, in the following embodiment of this application, an example in which the decision module 1021 in the central processing unit 100 performs the operation of obtaining the data processing request is used for description. The to-be-processed data may be one data block, or may be a plurality of data blocks. For ease of description, in the following description of this application, an example in which the to-be-processed data is one data block is used for description, and the data block is referred to as a first data block for short.

In FIG. 1, the application 101 may actively send a data processing request carrying to-be-processed data to the decision module 1021. Alternatively, the decision module 1021 may periodically query the application 101 for whether there is a to-be-processed data processing request. The application 101 performs an encryption operation on the to-be-processed data by using a stream cipher.

The data processing request may further carry an operation type indicating the to-be-processed data, where operation types include two types: encryption and decryption. The decision module may complete processing for the to-be-processed data based on the operation type of the data processing request. A specific encryption algorithm may be a symmetric-key algorithm, for example, AES and SM4.

It should be noted that a specific implementation process of the symmetric-key algorithm does not constitute a limitation on this application. In a specific implementation, any symmetric encryption algorithm may be used to implement encryption on the to-be-processed data.

Optionally, the data processing request further includes an input address and an output address of encrypted data, and a length of the to-be-processed data. The input address is used to indicate a storage location of the to-be-processed data, and is generally an address of a storage space that is in a memory connected to the central processing unit and that is used to store the to-be-processed data. The input address may also be an address of another storage space accessible to the central processing unit. The output address is used to indicate a storage location of an encryption result of the to-be-processed data. The storage location may also be an address of a storage space that is in the memory connected to the central processing unit and that is used to store the encryption result of the to-be-processed data. Alternatively, the storage location may be an accessible storage location specified by the application, so that the application can obtain the encryption result of the to-be-processed data by using the storage location.

S202: Select one of a first processing manner and a second processing manner as a processing manner of the to-be-processed data.

In the first processing manner, processing is performed by an encryption/decryption chip, and in the second processing manner, processing is performed by a software program running on a central processing unit. The first processing manner may alternatively be referred to as a hardware encryption/decryption manner, and the second processing manner may alternatively be referred to as a software encryption/decryption manner. The software encryption/decryption manner refers to a manner in which encryption or decryption is performed on the first data block by using a software program running in a processor (for example, a CPU). The hardware encryption/decryption manner is a manner in which encryption or decryption is performed on the first data block by using a dedicated encryption/decryption chip (for example, the encryption/decryption chip 200 in FIG. 1).

A process of selecting a processing manner of the to-be-processed data may be performed in any one of the following manners.

In Manner 1, a processing manner of the to-be-processed data is selected based on a size of the to-be-processed data and a first parameter.

The first parameter includes an encryption or decryption delay generated when a data block of a unit length is processed. The data block of a unit length refers to a data block of a fixed size, for example, a data block of a 512 M size. For the hardware encryption/decryption manner, the first parameter may be a delay generated when an encryption/decryption chip performs an encryption or decryption operation on a data block of a fixed size. Generally, the delay may be obtained from a manual of the encryption/decryption chip. For the software encryption/decryption manner, the first parameter may be a delay generated when encryption or decryption is performed on a data block of a same fixed size in the software encryption/decryption manner, and is usually a statistical value of historical data.

Further, a first processing delay and a second processing delay may be predicted based on the size of the to-be-processed data and the first parameter. The first parameter may include a processing delay generated when the data block of a unit length is processed in the first processing manner and a processing delay generated when the data block of a unit length is processed in the second processing manner, the first processing delay is a processing delay generated when the to-be-processed data is processed in the first processing manner, and the second processing delay is a processing delay generated when the to-be-processed data is processed in the second processing manner. Further, a processing manner is selected based on a result of comparison between the first processing delay and the second processing delay. For example, when the first processing delay is greater than a first preset delay threshold, the hardware encryption/decryption manner is selected to perform an encryption or decryption operation on the to-be-processed data. When the second processing delay is less than or equal to a second preset delay threshold, the software encryption/decryption manner is selected to perform an encryption or decryption operation on the to-be-processed data. The first preset delay threshold may be less than or equal to the second preset delay threshold. Specific values of the first preset delay threshold and the second preset delay threshold may be set based on empirical values, or may be set based on efficiency for processing data blocks of different sizes in the software encryption/decryption manner and the hardware encryption/decryption manner.

In Manner 2, a processing manner of the to-be-processed data is selected based on the size of the to-be-processed data.

Specifically, the first processing manner is selected when the size of the to-be-processed data is greater than a preset size threshold; or the second processing manner is selected when the size of the to-be-processed data is less than or equal to a preset size threshold.

Processing efficiency may be determined with reference to the size of the to-be-processed data and processing delays generated in the two processing manners. Further, a processing manner that matches the to-be-processed data is selected to perform an encryption or decryption operation. Alternatively, efficiency for processing to-be-processed data of different sizes in the software encryption/decryption manner and the hardware encryption/decryption manner may be evaluated based on different pre-constructed models. Further, it is determined that different processing manners are selected for the to-be-processed data of different sizes. For example, when the to-be-processed data is large, the to-be-processed data may be fragmented into a plurality of fragments, and different processor cores in a hardware encryption/decryption chip are used to perform encryption or decryption on each fragment. In this way, a processing capability of the hardware encryption/decryption chip is fully utilized, efficiency of an entire encryption or decryption process is improved, and a processing delay is reduced. When the to-be-processed data is small, if the hardware encryption/decryption manner is still used, an encryption delay generated when data of a unit length is low. However, in the hardware encryption/decryption manner, data migration needs to be implemented by using a technology such as a transparent data transmission technology. A data migration process includes a process in which fragments of the to-be-processed data are migrated to a storage on an encryption/decryption chip side, and an encryption result is migrated to a memory side. The entire migration process needs to occupy a hardware resource of an encryption/decryption chip and a network resource of a system. In this case, processing efficiency of encrypting or decrypting the to-be-processed data by the hardware chip may be lower than processing efficiency of encrypting the to-be-processed data in the software manner. Therefore, different processing manners may be respectively selected for to-be-processed data of different sizes, so that a matched processing manner is selected for each piece of to-be-processed data, a processing capability of a hardware encryption/decryption chip is fully utilized, and a data processing delay is reduced by a maximum degree.

S203: Perform an encryption operation on the to-be-processed data in the selected processing manner.

The decision module 1021 may indicate, based on the processing manner that is of the to-be-processed data and that is selected in step S202, the software encryption/decryption module 1022 or the encryption/decryption off-loading module 1024 to perform encryption or decryption on the first data block.

It should be noted that the method shown in FIG. 2 is mainly described by using an example in which the data processing request is an encryption operation request. A method for a decryption operation is similar to the foregoing method. Specifically, a decision module first obtains a data processing request, where the data processing request includes to-be-processed data; one of the first processing manner and the second processing manner is selected as a processing manner of the to-be-processed data; and a decryption operation is performed on the to-be-processed data in the selected processing manner. For brevity, details are not described herein again.

It can be learned from the foregoing description of the data encryption or decryption process that, in the data encryption or decryption method to be protected in this application, the first processing manner in which processing is performed by an encryption/decryption chip and the second processing manner in which processing is performed by a software program running on a central processing unit are provided. One of the foregoing two processing manners may be selected to perform an encryption or decryption operation on to-be-processed data, so that advantages of the software encryption/decryption manner and the hardware encryption/decryption manner are fully utilized, a delay generated in an encryption or decryption process is reduced, and data processing efficiency is improved.

Figure 3A:
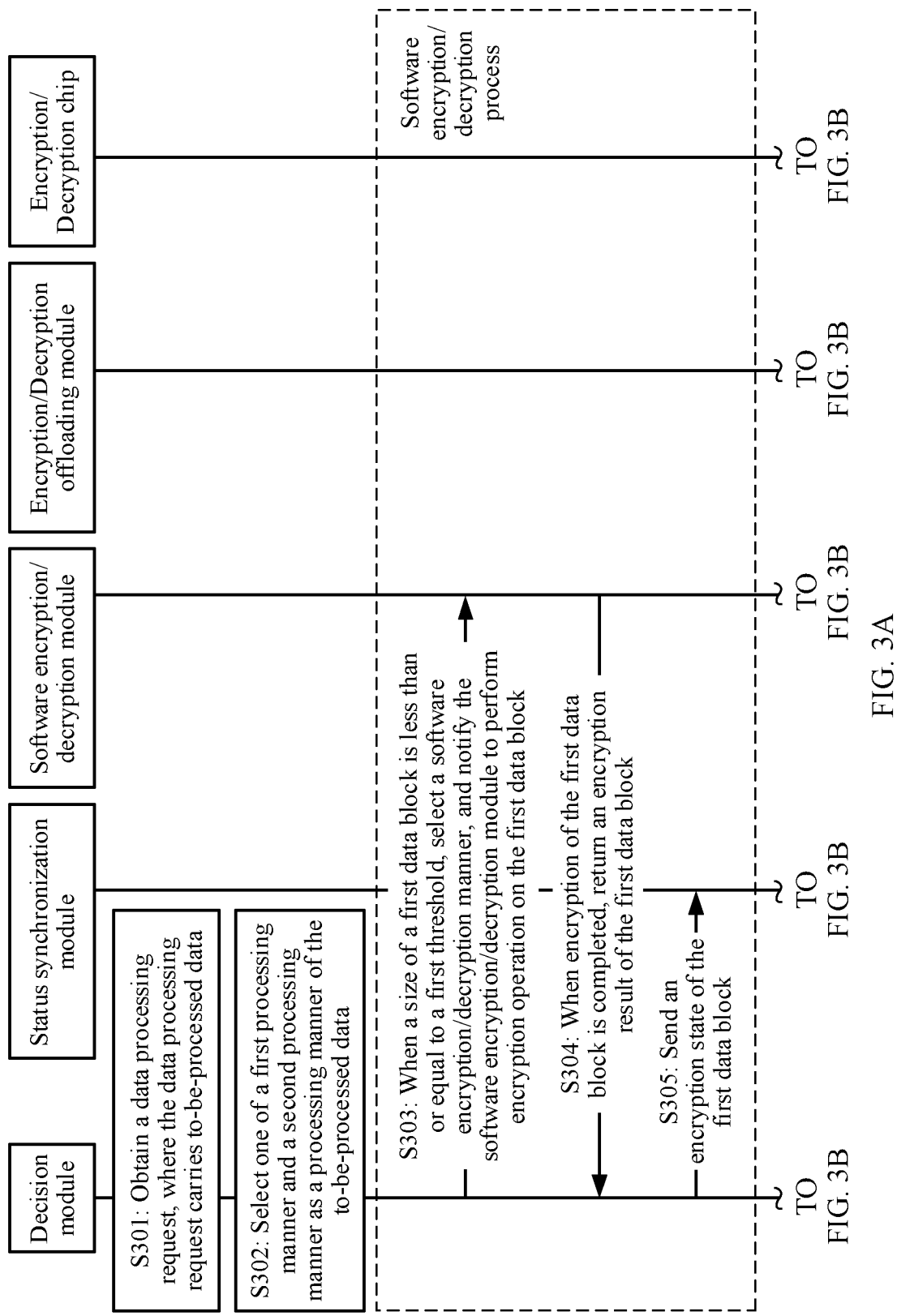
FIG. 3A to FIG. 3C are flowcharts of another data encryption or decryption method according to an embodiment of the present disclosure.
Figure 3B:
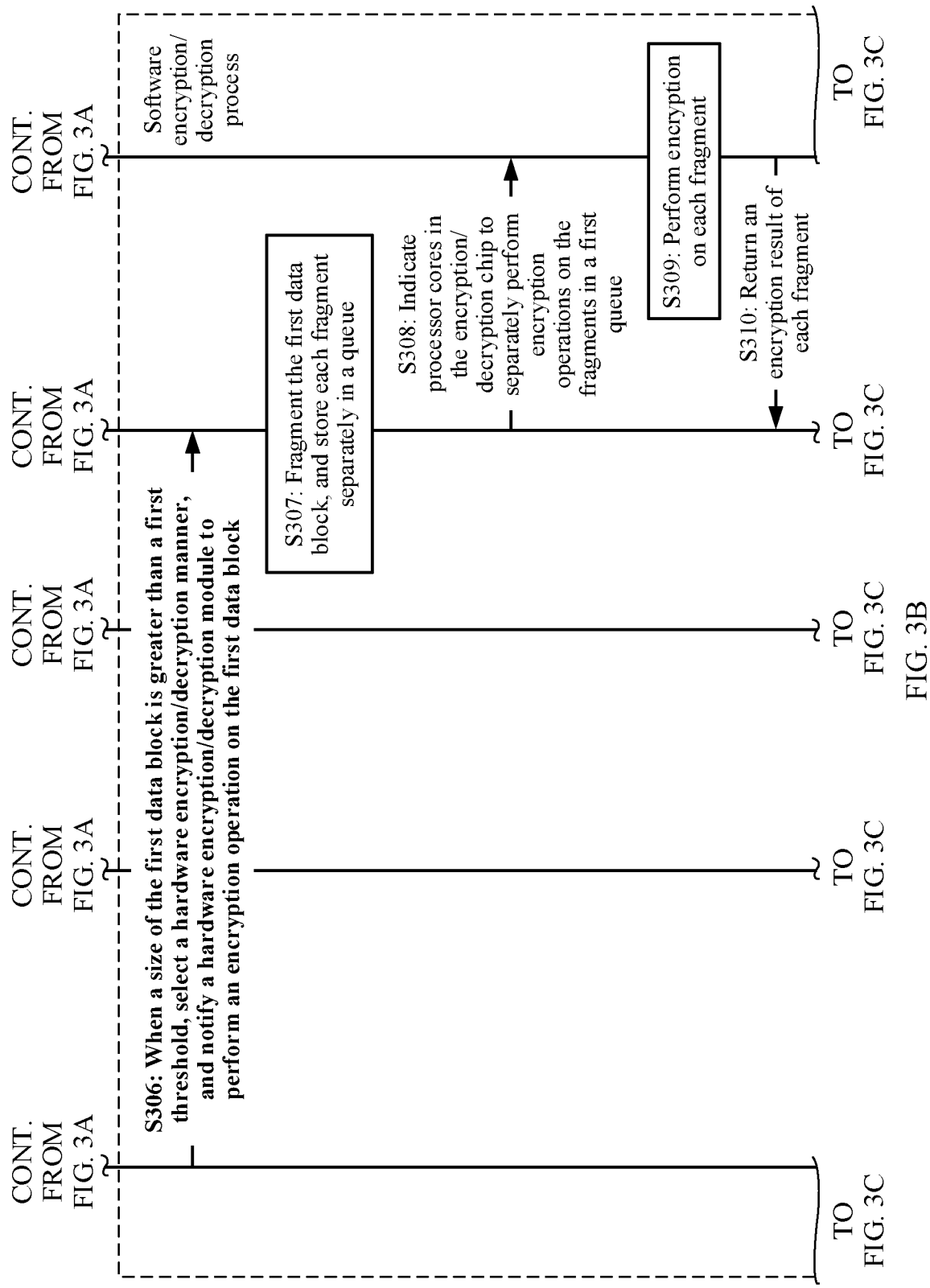
Figure 3C:
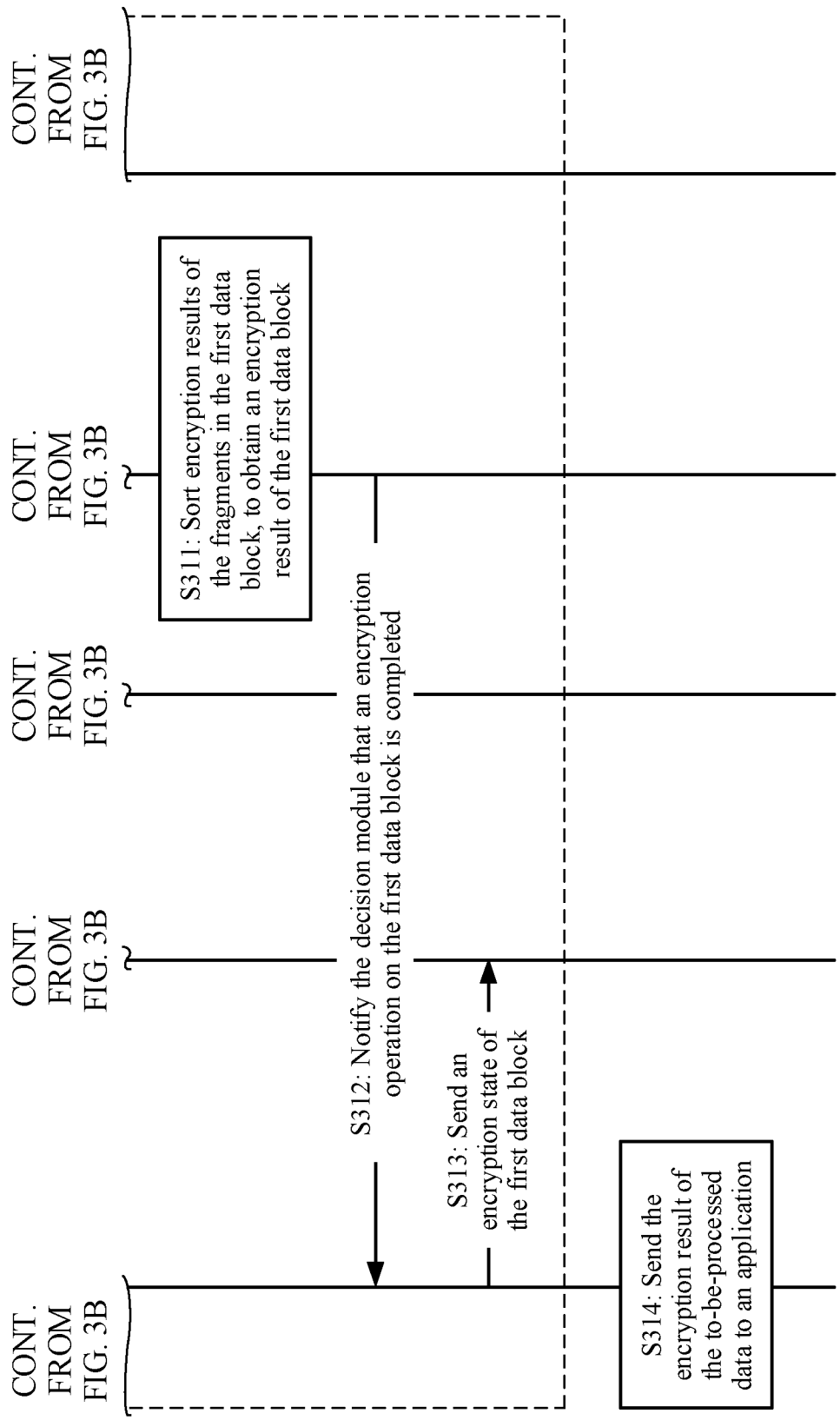

Next, based on the system shown in FIG. 1, the data encryption or decryption method provided in this application is further explained with reference to FIG. 3A to FIG. 3C by using an example in which to-be-processed data carried in a data processing request is a first data block, data processing is to perform encryption, and a selected processing manner is the foregoing Manner 2. As shown in the figure, the method includes the following steps.

S301: A decision module obtains a data processing request, where the data processing request includes to-be-processed data.

S302: The decision module selects one of the first processing manner and the second processing manner as a processing manner of the to-be-processed data.

Processing processes of the foregoing steps S301 and S302 are the same as those of steps S201 and S202 in FIG. 2. For brevity, details are not described herein again.

S303: When a size of the first data block is less than or equal to a first threshold, the decision module selects the software encryption/decryption manner, and notifies the software encryption/decryption module to perform encryption on the first data block.

The first threshold may alternatively be referred to as a preset size threshold, and the first threshold may be determined in any one of the following manners.

In Manner 1, the first threshold may be determined based on an empirical value.

In Manner 2, the first threshold may alternatively be obtained based on statistics for historical data.

In Manner 3, the first threshold may be further determined by pre-constructing an optimal evaluation model for a hardware encryption/decryption manner, so that a processing capability of a hardware encryption/decryption chip is utilized to the maximum.

For example, it is assumed that a processing delay of the to-be-processed data is represented by F(n), a hardware offloading cost is represented by t1, and t1 mainly includes a computing resource and a network resource that need to be occupied in a process in which an encryption/decryption offloading module sends the to-be-processed data to the hardware encryption/decryption chip. A size of the to-be-processed data is represented by L. A delay cost caused by processing a data block of a unit length in the hardware encryption/decryption manner is represented by k1, where k1 may be obtained based on statistical data, or may be obtained through query according to a configuration manual of the hardware encryption/decryption chip. A delay cost caused by processing a data block of a unit length in the software encryption/decryption manner is represented by k2, where k2 may be obtained based on statistical data. A quantity of fragments is represented by n, where n refers to a quantity of fragments into which the to-be-processed data is fragmented. For example, n may be a positive integer greater than or equal to 2, so that a plurality of processor cores of the hardware encryption/decryption chip perform encryption or decryption operations on fragmented data in parallel. In this case, F(n) may be calculated based on the following three scenarios. Details are as follows.

In Scenario 1, a processing manner is a hardware encryption/decryption manner, and an application waits.

Figure 4A:
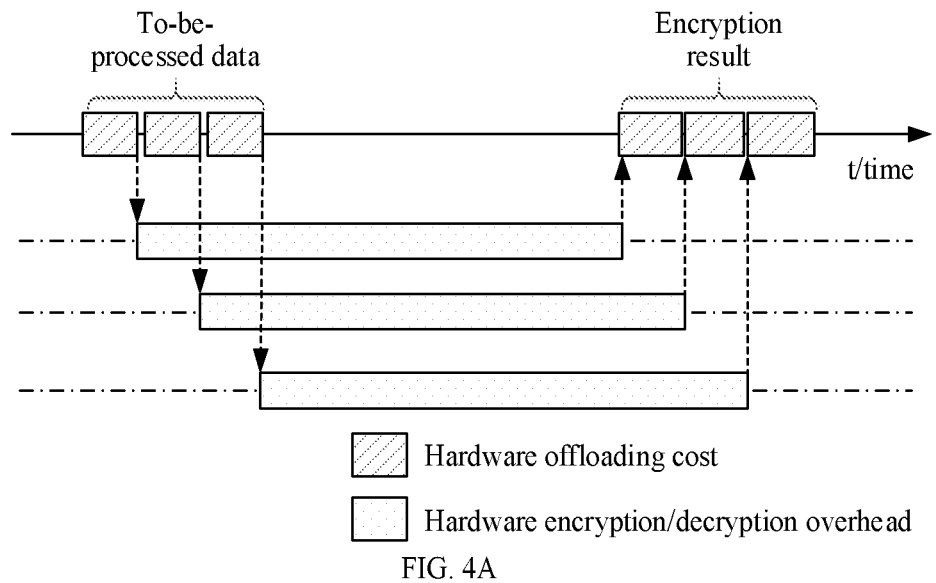
FIG. 4A to FIG. 4C are a schematic diagrams of constructing an optimal evaluation model for a hardware encryption/decryption manner according to an embodiment of the present disclosure.

In Scenario 1, a size of to-be-processed data is usually large. Different processor cores in an encryption/decryption chip are used to process fragments of the to-be-processed data in parallel. However, a delay for using a hardware encryption/decryption manner is limited by a quantity of processor cores in the encryption/decryption chip and a quantity of data migration channels. Therefore, in this scenario, the hardware encryption/decryption chip cannot quickly complete an encryption or decryption operation on the to-be-processed data, and an application inevitably needs to wait. The quantity of data migration channels is a quantity of channels in which the to-be-processed data can be migrated from a memory to a storage of the encryption/decryption chip. For example, as shown in FIG. 4A, to-be-processed data is fragmented into three fragments. Accordingly, a hardware offloading cost t1 includes a sum of costs caused by fragmenting the to-be-processed data into the fragments and migrating the fragments between a memory and a storage of an encryption/decryption chip, and data processing overheads of the encryption/decryption chip are k1*a quantity of the fragments. In this case, the following Formula 1 may be used to represent F(n) and a constraint condition thereof:

$$F(n) = t1 + k_1 * \frac{L}{n} + n * t1 \quad \text{Constraint condition:} k1 * \frac{L}{n} > (n-1) * t1 \quad \text{Formula 1}$$

In Scenario 2, a processing manner is a hardware encryption/decryption manner, and an application waits.

Figure 4B:
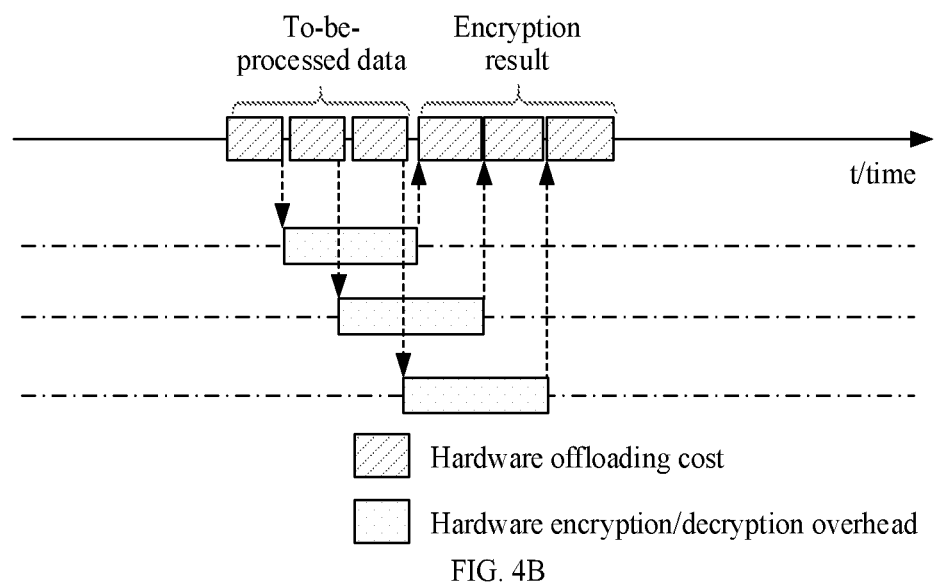

In Scenario 2, a size of to-be-processed data is usually small. As shown in FIG. 4B, the to-be-processed data is fragmented into a plurality of fragments, and a plurality of processor cores in an encryption/decryption chip are used to perform encryption or decryption operations on different pieces of fragmented data in parallel, so that a data processing delay can be reduced by a maximum degree. A critical case of an optimal quantity of fragments in this scenario is that an application does not wait. Similar to the case of Scenario 1, the following Formula 2 may be used to represent F(n) and a constraint condition thereof:

$$F(n) = n * t1 + n * t1 \quad \text{Constraint condition:} k1 * \frac{L}{n} \leq (n-1) * t1 \quad \text{Formula 2}$$

In Scenario 3, a processing manner is a software encryption/decryption manner.

Figure 4C:
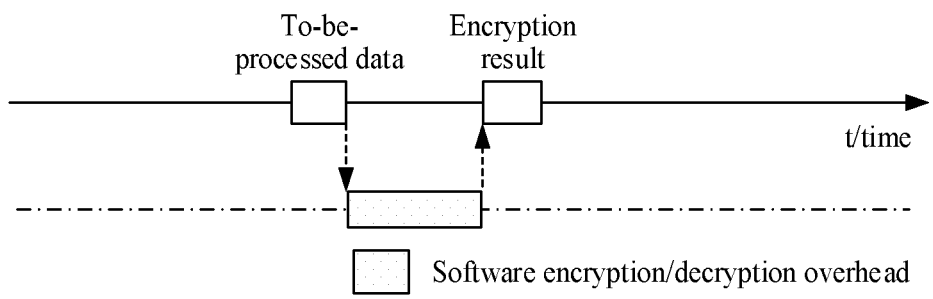

In Scenario 3, to-be-processed data is usually very small, and is generally of dozens or hundreds of bytes in size. As shown in FIG. 4C, in this case, benefits brought by a hardware encryption/decryption chip that performs an encryption or decryption operation on a central processing unit cannot be fully utilized, and the to-be-processed data may be encrypted in the software encryption/decryption manner. In this case, the following Formula 3 may be used to represent F(n) and a constraint condition thereof:

$$F(n) = L*k1 \quad \text{Constraint condition: } L*k1 \leq L*k1+2*t1 \quad \text{Formula 3}$$

Based on the foregoing three scenarios, an optimal evaluation model for a hardware encryption/decryption manner can be constructed as follows:

$$F(n) = \begin{cases} t1 + k_1 * \frac{L}{n} + n * t1 & \left(k_1 * \frac{L}{n} > (n-1)*t1\right) \\ n*t1 + n*t1 & \left(k_1 * \frac{L}{n} \leq (n-1)*t1\right) \\ L*k_2 & (L*k_2 \leq L*k_1 + 2*t1) \end{cases} \quad \text{Formula 4}$$

The following policies may be determined based on the foregoing optimal evaluation model for a hardware encryption/decryption manner.

When a size of to-be-processed data meets the following Formula 5, an encryption or decryption operation is performed on the to-be-processed data in the software encryption/decryption manner, where Formula 5 is as follows:

$$L \leq \frac{2*t1}{k2-k1} \quad \text{Formula 5}$$

When a size of to-be-processed data meets the following Formula 6, an encryption or decryption operation is performed on the to-be-processed data in the hardware encryption/decryption manner, where Formula 6 is as follows:

$$L > \frac{2*t1}{k2-k1} \quad \text{Formula 6}$$

In conclusion, in the manner of constructing an optimal evaluation model for a hardware encryption and decryption manner, a first threshold may be $$\frac{2*t1}{k2-k1}.$$

When a size of to-be-processed data meets Formula 5, an encryption or decryption operation is performed on the to-be-processed data in the software encryption/decryption manner. When a size of to-be-processed data meets Formula 6, an encryption or decryption operation is performed on the to-be-processed data in the hardware encryption/decryption manner.

Further, when a size of the first data block is less than or equal to the first threshold, the decision module selects the software encryption/decryption manner, and notifies the software encryption/decryption module to perform encryption or decryption on the first data block.

S304: When encryption of the first data block is completed, the software encryption/decryption module returns an encryption result of the first data block to the decision module.

After completing encryption of the first data block, the software encryption/decryption module returns the encryption result of the first data block to the decision module. The decision module manages the encryption result of the first data block, and sends the encryption result of the to-be-processed data to the application. In other words, in this application, the decision module selects a processing manner according to a preset rule, indicates the software encryption/decryption module or the encryption/decryption offloading module to separately perform an encryption or decryption operation on the to-be-processed data, and summarizes an encryption result of each data block returned by the software encryption/decryption module or the encryption/decryption offloading module. Finally, the decision module returns the encryption result of the to-be-processed data to the application. The decision module may store the encryption result of the first data block by using the data buffer applied for in the initialization process. For example, in FIG. 5, a data block a1 is encrypted in a software encryption and decryption manner, and an encryption result is stored in a data buffer applied for in an initialization phase. Finally, an encryption result of to-be-processed data is stored, according to an output address that is of the to-be-processed data and that is carried in a data processing request, in an output address specified by an application.

S305: The decision module sends an encryption state of the first data block to a status synchronization module.

Encryption or decryption operations may be performed on adjacent pieces of to-be-processed data in different processing manners, and an association relationship may exist between the adjacent pieces of to-be-processed data. Therefore, for the software encryption/decryption module and the encryption/decryption offloading module, a location of a currently processed data block in an entire stream mode data processing process and an association relationship between the currently processed data block and other to-be-processed data cannot be learned. In this case, the status synchronization module needs to be used to record an encryption state of each piece of to-be-processed data in the adjacent pieces of to-be-processed data, to ensure that pieces of to-be-processed data can be encrypted or decrypted one by one according to a sequence.

The foregoing steps S303 to S305 may alternatively be referred to as a software encryption/decryption process. In other words, when the size of the first data block is less than or equal to the first threshold, the software encryption/decryption manner is selected to perform processing on the first data block. When the size of the first data block is greater than the first threshold, the hardware encryption/decryption manner is selected to perform processing on the first data block. For details, refer to steps S306 to S313.

Steps S306 to S313 may alternatively be referred to as a hardware encryption/decryption process. A detailed operation process is as follows:

S306: When a size of the first data block is greater than a first threshold, the hardware encryption/decryption manner is selected, and the encryption/decryption offloading module is notified to perform an encryption operation on the first data block.

For example, in the foregoing step S303, if the size of the to-be-processed data meets Formula 6, an encryption or decryption operation is performed on the first data block in the hardware encryption/decryption manner.

S307: The encryption/decryption offloading module fragments the first data block, and stores each fragment separately in a first queue.

In a possible implementation, when the hardware encryption/decryption manner is selected, the to-be-processed data may be further fragmented to obtain a plurality of fragments, and a plurality of processor cores in the encryption/decryption chip are used to separately perform processing on all fragments in parallel, so that processing efficiency of the hardware encryption/decryption manner is improved.

Specifically, a quantity of fragments may be first determined based on the size of the first data block and a processing capability of the hardware encryption/decryption chip. Then the first data block is fragmented based on the determined quantity of fragments, to obtain two or more fragments. The processing capability of the hardware encryption/decryption chip includes a quantity of processor cores in the encryption/decryption chip, a quantity of data channels, and a processing delay generated when each processor core processes a data block of a unit length.

Optionally, Formula 7 may be determined based on the foregoing optimal evaluation model for a hardware encryption/decryption manner, and the first data block is fragmented according to Formula 7:

$$n = \sqrt{\frac{k_1 * L}{t1}} \qquad \text{Formula 7}$$

Figure 5:
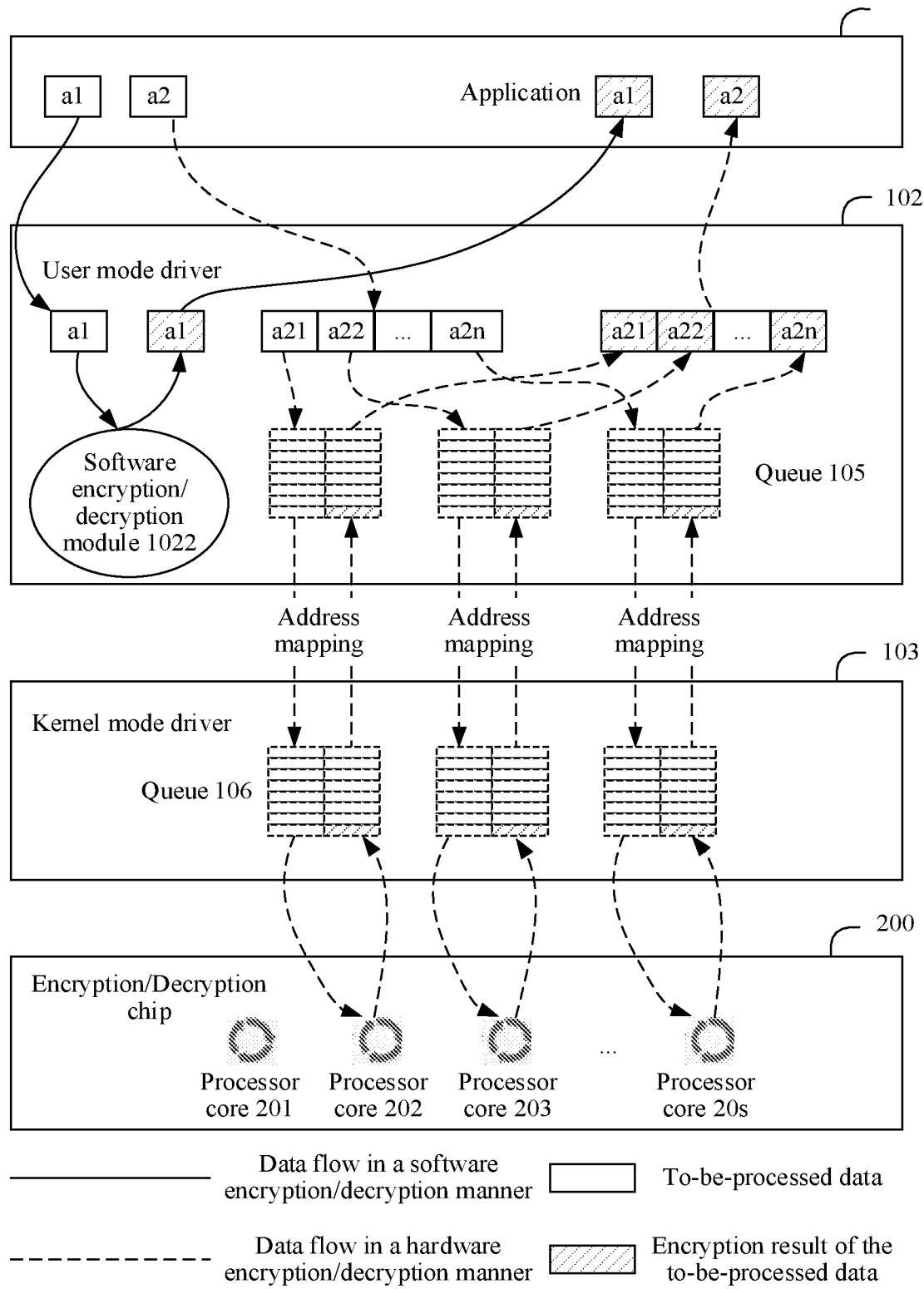
FIG. 5 is a flowchart of still another data encryption or decryption method according to an embodiment of the present disclosure.

In a fragmentation process of the first data block, the queue 105 that is applied for in the initialization phase and that is shown in FIG. 5 may be used to store each piece of fragmented data and an encryption result of the fragmented data. For ease of description, the queue 105 may alternatively be referred to as a first queue.

S308: The encryption/decryption offloading module indicates the encryption/decryption chip to separately perform encryption/decryption on fragments included in an encryption/decryption engine queue.

After obtaining the indication from the encryption/decryption offloading module, the encryption/decryption chip may select a first processor core set from the plurality of processor cores in the encryption/decryption chip. A quantity of processor cores in the first processor core set is greater than or equal to the quantity of fragments obtained by fragmenting the to-be-processed data. Optionally, the encryption/decryption chip may select the first processor core set from processor cores that are in an idle state. Further, the encryption/decryption chip may further determine a matching relationship between a processor core in the first processor core set and each fragment, that is, a relationship between a fragment and a processor core that performs an encryption or decryption operation on each fragment. Further, the foregoing two or more fragments obtained through fragmentation are sent to processor cores in the first processor core set, so that each processor core in the first processor core set separately performs an encryption or decryption operation on different fragments. The matching relationship between a processor core in the first processor core set and each fragment may be determined based on computing power of each processor core in the encryption/decryption chip and a size of each fragment. Specifically, fragments of the to-be-processed data may be different, and a matched processor core may be selected based on computing power of a processor core in an idle state, to improve a speed for processing each fragment.

Optionally, in addition to indicating the encryption/decryption chip to select the first processor core set, the encryption/decryption offloading module may also record a quantity of processor cores in the encryption/decryption chip and a working status of each processor core. When the first data block needs to be encrypted or decrypted in the hardware encryption/decryption manner, alternatively, the encryption/decryption offloading module may select the first processor core set based on the status recorded by the encryption/decryption offloading module, and determine the matching relationship between a processor core in the first processor core set and each fragment. Further, the encryption/decryption offloading module notifies the encryption/decryption chip that the processor core in the first processor core set separately performs an encryption or decryption operation on different fragments based on the foregoing matching relationship.

In a possible implementation, the fragmentation process of the to-be-processed data in step S307 may alternatively be a process in which the encryption/decryption offloading module 1023 directly sends the to-be-processed data to the encryption/decryption chip 200, and the encryption/decryption chip fragments the to-be-processed data according to the foregoing Formula 7, selects the first processor core set, and further determines an association relationship between a processor core in the first processor core set and a fragment.

S309: The encryption/decryption chip performs encryption on each fragment.

S310: The encryption/decryption chip returns an encryption result of each fragment to the encryption/decryption offloading module.

The encryption/decryption chip includes a plurality of processor cores, and different processor cores may perform encryption on different fragments in parallel, to improve encryption efficiency of the first data block, and reduce an encryption delay generated when the first data block is processed.

It should be noted that a process in which each processor core encrypts each fragment according to a specific algorithm is not limited in this application. In a specific implementation process, encryption or decryption on each fragment may be completed based on a requirement of the specific algorithm.

FIG. 5 is a schematic flowchart of another type of data encryption/decryption according to an embodiment of the present disclosure. As shown in the figure, an example in which a system includes a queue 105 (which may also be referred to as a first queue) and an encryption/decryption chip 200 includes s processor cores is used for description. The queue 105 includes a queue for storing fragments and a queue for storing encryption results. The encryption/decryption chip 200 includes a queue 106 (which may also be referred to as a second queue). A structure of the queue 106 may be the same as or similar to that of the queue 105. For example, a quantity included in the queue 106 may be the same as that included in the queue 105, and the queue 106 and the queue 105 have a same queue depth. Alternatively, a quantity included in the queue 106 is greater than or equal to a quantity included in the queue 105, and a queue depth of the queue 106 is greater than or equal to a queue depth of the queue 105. An initialization and transparent data transmission module 1031 may implement data migration between the queue 105 and the queue 106. Optionally, the encryption/decryption chip 200 may alternatively implement data migration between the queue 106 and the queue 105 by using a DMA controller. Specifically, the encryption/decryption chip 200 may migrate fragmented data in the queue 105 to a storage of the encryption/decryption chip 200 in a direct memory access manner, and separately perform an encryption operation on each fragment by using a processor core 201 to a processor core 20s of the encryption/decryption chip 200. Then, after the encryption is performed on each fragment, according to a method similar to the foregoing method, the initialization and transparent data transmission module 1031 shown in FIG. 1 or the direct memory access controller in the encryption/decryption chip 200 migrates encryption results of the fragmented data to the queue 105, so that an application can obtain the encryption results of the to-be-processed data.

S311: The encryption/decryption offloading module sorts the encryption results of the fragmented data in the first data block, to obtain an encryption result of the first data block.

Because the first data block is fragmented into a plurality of fragments, a data migration speed and a processing capability of each processor core may be different, and encryption or decryption operations cannot be sequentially completed on the encryption results of the fragmented data according to a fragmentation sequence. To ensure accuracy of the encryption result of the first data block, the encryption/decryption offloading module may further record a fragmentation sequence of the first data block, and separately store the encryption results of the fragments based on the fragmentation sequence of each shard.

For example, as shown in FIG. 5, the decision module 1021 selects a hardware encryption/decryption manner to encrypt a data block a2, and indicates the encryption/decryption offloading module 1024 to perform an encryption operation on the data block a2. The encryption/decryption offloading module 1024 may perform fragmentation processing on the data block a2. For example, the data block a2 is fragmented into a total of n fragments whose sequence numbers range from a21 to a2n. Each fragment has a unique sequence number, and the fragments are separately stored in the queue 105. When encryption operations on the fragmented data are completed, the encryption/decryption chip 200 or the kernel mode driver 103 may store, according to sequence numbers of the fragments, encryption results of the pieces of fragmented data in a specified location in a direct memory access manner or a transparent data transmission manner. For example, the queue 105 is pre-fragmented into n storage spaces according to a sequence of the fragments, and each storage space is used to store an encryption result associated with a sequence number of one piece of fragmented data. For example, an encryption result of a fragment a22 is stored in a storage location add-2 that is associated with a sequence number 22 and that is in the queue 105. When the encryption result of the fragment a22 is received, the result may be directly stored in a storage space corresponding to the storage address add-2. When it is detected that data is stored in all the n storage spaces pre-agreed in the queue 105, it may be determined that encryption operations have been completed on all the pieces of fragmented data of the data block a2. In this case, encryption results of all the fragments may be obtained in sequence according to the n pre-fragmented storage spaces. Then, the encryption results are combined, and a result obtained through combination is stored at an output address specified by the application as an encryption result of the data block a2. That the encryption results are combined includes: reading the encryption results in sequence, and storing each reading result one by one at the output address specified by the application. Optionally, that the encryption results are combined may alternatively be as follows: The encryption results are stitched in the data buffer that is of the to-be-processed data and that is applied for in the initialization phase. In other words, the encryption results of all the fragments are combined according to a sequence of the fragments, to form a complete encryption result of the data block a2. Finally, the complete encryption result is stored at the output address specified by the application.

S312: The encryption/decryption offloading module notifies the decision module that an encryption operation on the first data block is completed.

After completing the encryption operation on the first data block, the encryption/decryption offloading module sends a notification to the decision module, to notify the decision module that the encryption operation on the first data block has been completed. Optionally, the encryption/decryption offloading module may send, to the decision module, a storage address for storing the encryption result of the first data block. Optionally, the encryption/decryption offloading module may alternatively directly send the encryption result of the first data block to the decision module.

S313: The decision module sends an encryption state of the first data block to the status synchronization module.

An execution process of steps S312 and S313 is similar to an operation process of steps S304 and S305. When the first data block is encrypted in the hardware encryption/decryption manner, the decision module may also synchronize the encryption state of the first data block to the status synchronization module, to ensure consistency of data blocks in the to-be-processed data.

S314: The decision module sends the encryption result of the to-be-processed data to the application.

The decision module may directly send the encryption result of the to-be-processed data to the application, or may send the address for storing the encryption result to the application. Alternatively, the decision module may store the encryption result at the pre-agreed output address in advance, and send, to the decision module, a notification indicating that the encryption operation is completed, so that the application obtains the encryption result of the to-be-processed data from the output address according to the agreement.

In a possible implementation, when to-be-processed data carried in a data processing request includes a plurality of first data blocks, encryption or decryption may be completed on each data block according to the software encryption/decryption process described in steps S303 to S305 or the hardware encryption/decryption process described in steps S306 to S313. The decision module 1021 may determine, by periodically detecting the queue 105, whether encryption has been completed on each to-be-processed data block in the data processing request. When determining that encryption or decryption has been completed on all data blocks of the to-be-processed data, the decision module 1021 stores the encryption results of all the data blocks included in the data processing request at the output address specified by the application, so that an encryption operation requested in the encryption/decryption request is completed on the to-be-processed data. For example, as shown in FIG. 5, a data processing request includes two pieces of to-be-processed data: a1 and a2. After an encryption operation is completed on both a1 and a2, the decision module 1021 stores encryption results of a1 and a2 into output locations specified by the application, so that the application obtains the encryption results of the data processing request.

In a possible implementation, after step S314, the decision module 1021 may further release software and hardware resources, for example, software resources such as a processor process, and hardware resources such as a data buffer applied for in an initialization phase and a processor core of an encryption/decryption chip, so that the system shown in FIG. 1 can further process a data processing request from a same application or another application.

In a possible embodiment, FIG. 3A to FIG. 3C to FIG. 5 describe the data encryption or decryption method in this application by using encryption as an example. The method is also applicable to a decryption process. Similar to the foregoing method, in the decryption process, a similar method may be used to perform a decryption operation on to-be-processed data.

It can be learned from the foregoing description that this application provides two data encryption or decryption manners. A processing manner may be selected based on a size of to-be-processed data, and the selected processing manner is used to indicate a software encryption/decryption module or an encryption/decryption offloading module to perform an encryption or decryption operation on the to-be-processed data. For large to-be-processed data, a hardware offloading capability of an encryption/decryption chip may be fully utilized, to reduce a processing delay generated in a data processing process and improve efficiency. For small to-be-processed data, an encryption or decryption operation may be performed in a software encryption/decryption manner. In this way, that a processing manner is selected based on sizes of different data blocks is implemented, a processing capability of an encryption/decryption chip is fully utilized, data processing efficiency is improved, and a data processing delay is reduced. In addition, in a hardware encryption/decryption manner, to-be-processed data may be further fragmented, and a plurality of processor cores in the encryption/decryption chip are used to perform encryption or decryption operations on all pieces of fragmented data in parallel, to fully utilize a processing capability of the encryption/decryption chip in a decryption process, reduce a processing delay of the decryption operation, and further improve data processing performance of the entire system.

It should be noted that, for brief description, the foregoing method embodiments are represented as a series of actions. However, a person skilled in the art should know that this application is not limited to the described order of the actions. In addition, a person skilled in the art should also know that all the embodiments described in this specification are embodiments, and the related actions are not necessarily mandatory to this application.

Another proper combination of steps that can be figured out by a person skilled in the art based on the foregoing described content also falls within the protection scope of this application. In addition, a person skilled in the art should also know that all the embodiments described in this specification are exemplary embodiments, and the related actions are not necessarily mandatory to this application.

The foregoing describes in detail the data encryption or decryption method provided in this application with reference to FIG. 1 to FIG. 5. The following describes a data encryption or decryption apparatus and system provided in this application with reference to FIG. 6 and FIG. 7.

Figure 6:
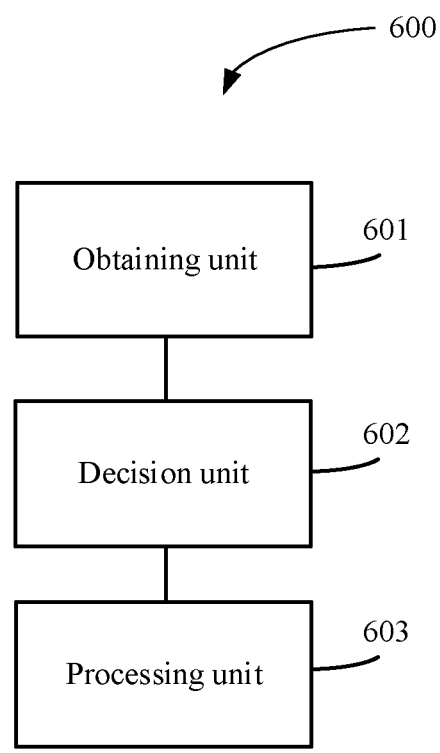
FIG. 6 is a schematic diagram of a structure of an encryption/decryption apparatus according to an embodiment of the present disclosure.

FIG. 6 is a schematic diagram of a structure of a data encryption or decryption apparatus 600 according to an embodiment of the present disclosure. As shown in the figure, the apparatus 600 includes an obtaining unit 601, a decision unit 602, and a processing unit 603.

The obtaining unit 601 is configured to obtain a data processing request, where the data processing request includes to-be-processed data.

The decision unit 602 is configured to select one of a first processing manner and a second processing manner as a processing manner for the to-be-processed data, where in the first processing manner, processing is performed by an encryption/decryption chip, and in the second processing manner, processing is performed by a software program running on a central processing unit.

The processing unit 603 is configured to perform an encryption or decryption operation on the to-be-processed data in the selected processing manner.

It should be understood that the apparatus 600 in this embodiment of this application may be implemented by using an ASIC or a programmable logic device (PLD). The PLD may be a complex programmable logical device (CPLD), an FPGA, a generic array logic (GAL), or any combination thereof. Alternatively, when the data processing methods shown in FIG. 2 to FIG. 5 may be implemented by using software, the apparatus 600 and the modules of the apparatus 600 may alternatively be software modules.

Optionally, the decision unit 602 is further configured to select the processing manner of the to-be-processed data based on a size of the to-be-processed data and a first parameter, where the first parameter includes an encryption or decryption delay generated when a data block of a unit length is processed.

Optionally, the decision unit 602 is further configured to: obtain, through prediction, a first processing delay and a second processing delay based on the size of the to-be-processed data and the first parameter, where the first parameter includes a processing delay generated when the data block of a unit length is processed in the first processing manner and a processing delay generated when the data block of a unit length is processed in the second processing manner, the first processing delay is a processing delay generated when the to-be-processed data is processed in the first processing manner, and the second processing delay is a processing delay generated when the to-be-processed data is processed in the second processing manner; and select the processing manner based on a result of comparison between the first processing delay and the second processing delay.

Optionally, the decision unit 602 is further configured to select the processing manner of the to-be-processed data based on the size of the to-be-processed data.

Optionally, the decision unit 602 is further configured to: select the first processing manner when the size of the to-be-processed data is greater than a preset size threshold; or select the second processing manner when the size of the to-be-processed data is less than or equal to a preset size threshold.

Optionally, the processing unit 603 is further configured to: fragment the to-be-processed data, and separately perform the encryption or decryption operation on different fragments by using a plurality of hardware encryption/decryption engines in the encryption/decryption chip.

Optionally, the processing unit 603 is further configured to: determine a quantity of fragments based on the size of the to-be-processed data, a quantity of processor cores in the encryption/decryption chip, a quantity of data channels, and a processing delay generated when each processor core processes a data block of a unit length; and fragment the first data block based on the determined quantity of fragments, to obtain two or more fragments.

Optionally, the processing unit 603 is further configured to: select a first processor core set from a plurality of processor cores in the hardware encryption/decryption engine, where a quantity of processor cores in the first processor core set is greater than or equal to a quantity of the fragments obtained by fragmenting the to-be-processed data; and send the two or more fragments to the processor cores in the first processor core set, so that each processor core in the first processor core set separately performs an encryption or decryption operation on different fragments in the two or more fragments.

Optionally, the processing unit 603 is further configured to: sort encryption results of all the fragments of the to-be-processed data according to a sequence of the fragments, to obtain an encryption result of the to-be-processed data.

The apparatus 600 according to this embodiment of this application may correspondingly perform the methods described in the embodiments of this application. The foregoing and other operations and/or functions of the units in the apparatus 600 are separately used to implement corresponding processes of the methods in FIG. 2 to FIG. 5. For brevity, details are not described herein again.

By using the foregoing apparatus 600, two processing manners of data encryption or decryption may also be provided. Different processing manners may be selected based on a specific situation, so that a processing capability of an encryption/decryption chip is fully utilized and data processing efficiency is improved. Further, in a hardware encryption/decryption manner, the to-be-processed data may be further fragmented into a plurality of fragments, and a plurality of processor cores separately perform encryption or decryption operations on different fragments, so that a process in which processing is performed on the fragments in parallel is implemented, and data processing efficiency is further improved.

Figure 7:
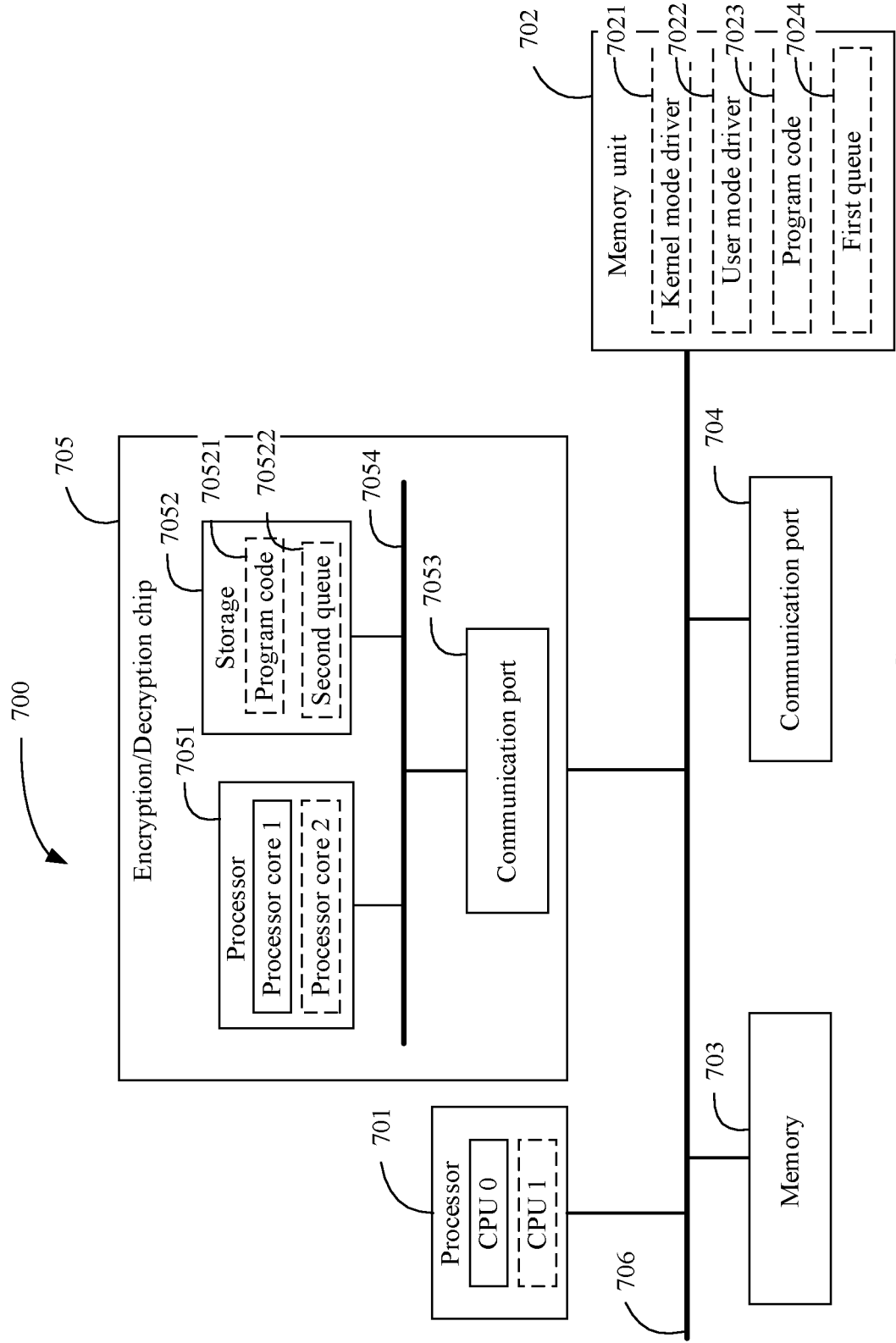
FIG. 7 is a schematic diagram of a structure of an encryption/decryption system according to an embodiment of the present disclosure.

FIG. 7 is a schematic diagram of a structure of a data encryption or decryption system 700 according to an embodiment of the present disclosure. As shown in the figure, the system 700 includes a processor 701, a memory unit 702, a storage 703, a communication interface 704, an encryption/decryption chip 705, and a bus 706. The processor 701, the memory unit 702, the storage 703, the communication interface 704, and the encryption/decryption chip 705 communicate with each other through the bus 706, or may implement communication in another manner such as wireless transmission. The memory unit 702 is configured to store program code, and the processor 701 is configured to execute the program code stored in the memory unit 702. The processor 701 may invoke the program code stored in the memory unit 702 to perform the following operations: obtaining a data processing request, where the data processing request includes to-be-processed data, and the data processing includes encryption or decryption; selecting one of a first processing manner and a second processing manner as a processing manner for the to-be-processed data, where in the first processing manner, processing is performed by an encryption/decryption chip, and in the second processing manner, processing is performed by a software program running on a central processing unit; and performing an encryption or decryption operation on the to-be-processed data in the selected processing manner.

It should be understood that the storage 703 may also be configured to store program code. According to a processing manner in which the processor 701 reads and writes a memory unit and a storage in a computer, the processor 701 may first load the program code in the storage 703 to the memory unit 702, and then invoke specific instructions in the program code from the memory unit 702 to implement an operation process of the foregoing method.

It should be understood that, in this embodiment of this application, the processor 701 may be a CPU. The processor 701 may further be a DSP, an ASIC, a FPGA or another programmable logic device, a discrete or a transistor logic device, a discrete hardware component, or the like. Alternatively, the processor 701 may be a processor of another type, for example, a processor that has a computing capability, such as a GPU or an NPU.

The memory unit 702 includes a kernel mode driver 7021, a user mode driver 7022, program code 7023, and a first queue 7024 used for step S307 that are of the system shown in FIG. 1.

The storage 703 may include a read-only memory and a random access memory, and provide instructions and data to the processor 701. The storage 703 may further include a nonvolatile random access memory. For example, the storage 703 may further store information about a device type.

The storage 703 may be a volatile memory or a nonvolatile memory, or may include a volatile memory and a nonvolatile memory. The nonvolatile memory may be a read-only memory (ROM), a programmable ROM (PROM), an erasable PROM (EPROM), an electrically EPROM (EEPROM), or a flash memory. The volatile memory may be a random-access memory (RAM) and is used as an external cache. By way of example rather than limitative description, many forms of RAMs may be used, for example, a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM), and a direct Rambus RAM (DR RAM).

The communication interface 704 is configured to implement communication between the system 700 and another device or system outside the system. For example, the communication interface 704 may be a network interface card.

The encryption/decryption chip 705 includes a processor 7051, a storage 7052, a communication interface 7053, and a bus 7054. The processor 7051, the storage 7052, and the communication interface 7053 are connected with each other through the bus 7054. The processor 7051 may also include various types of processors, as is the case of the processor 701. Each processor includes a plurality of processor cores, for example, a processor core 1 and a processor core 2. The communication interface 7053 is configured to implement communication between the encryption/decryption chip 705 and another component and/or device. The storage 7052 includes program code 70521 and a second queue 70522, so that the encryption/decryption chip 705 implements operation steps of the methods performed by corresponding bodies in the methods shown in FIG. 2 to FIG. 5.

It should be noted that a quantity of processors in the processor 7051 and a quantity of processor cores included in each processor do not constitute a limitation on this application. In a specific implementation, a quantity of processors in an encryption/decryption chip and a quantity of processor cores in each processor may be configured based on a specific service requirement.

In addition to a data bus, the bus 706 may further include a power bus, a control bus, a status signal bus, and the like. However, for clear description, various types of buses in the figure are marked as the bus 703.

It should be understood that the system 700 according to this embodiment of this application may correspond to the apparatus 600 in embodiments of this application, and may correspond to a corresponding body performing the method 100 according to embodiments of this application. In addition, the foregoing and other operations and/or functions of the modules in the system 700 are respectively used to implement corresponding processes of the methods in FIG. 2 to FIG. 5. For brevity, details are not described herein again.

It can be learned from the description of the foregoing content that the system 700 may also provide two data encryption or decryption manners. One manner is selected as a processing manner of to-be-processed data based on a specific situation, so that encryption or decryption operations are performed on different to-be-processed data in different processing manners and data processing efficiency is improved. In another aspect, in a hardware encryption/decryption manner, to-be-processed data may be further fragmented into a plurality of fragments. Encryption or decryption operations are separately performed on different fragments by using a plurality of processor cores in an encryption/decryption chip, to implement a purpose that the plurality of fragments are processed in parallel and data processing efficiency is improved. In this way, a processing speed of a system can be further improved, and a processing delay is reduced.

In a possible implementation, this application further provides a data encryption or decryption system. Different from that in the system 700, in the system, a processor 701 and an encryption/decryption chip 705 are connected through an external network other than a bus. The external network includes the Ethernet, the fifth-generation (5G) mobile communication technology, and a wireless network. In this case, the system includes at least two devices. The processor 701 and the encryption/decryption chip 705 are respectively located in different devices. The processor 701 and the encryption/decryption chip 705 communicate with each other through an external network. The system may also be configured to implement the methods shown in FIG. 2 to FIG. 5. For brevity, details are not described herein again.

All or some of the foregoing embodiments may be implemented by using software, hardware, firmware, or any combination thereof. When software is used to implement embodiments, all or some of the foregoing embodiments may be implemented in a form of a computer program product. The computer program product includes one or more computer instructions. When the computer program instructions are loaded or executed on a computer, all or some of the processes or the functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), or a semiconductor medium. The semiconductor medium may be a solid-state drive (SSD).

The foregoing descriptions are merely specific implementations of this application, but the protection scope of this application is not limited thereto. Any person skilled in the art can easily figure out various equivalent modifications or replacements within the technical scope disclosed in this application, and these modifications or replacements shall fall within the protection scope of this application. Therefore, the protection scope of this application shall be subject to the protection scope of the claims.

What is claimed is:

1. A method comprising:
obtaining a data processing request comprising to-be-processed data;
selecting one of a first processing manner and a second processing manner as a processing manner for the to-be-processed data based on a size of the to-be-processed data and a first parameter, wherein the first processing manner is to be performed by an encryption/decryption chip, wherein the second processing manner is to be performed by a software program running on a central processing unit, wherein the first parameter comprises an encryption delay or a decryption delay generated when a data block of a unit length is processed, and wherein selecting the processing manner comprises:
predicting a first processing delay and a second processing delay based on the size of the to-be-processed data and the first parameter, wherein the first parameter further comprises a third processing delay and a fourth processing delay, wherein the third processing delay is generated when the data block is processed using the first processing manner, wherein the fourth processing delay is generated when the data block is processed using the second processing manner, and wherein the first processing delay is generated when the to-be-processed data is processed using the first processing manner, and the second processing delay is generated when the to-be-processed data is processed using the second processing manner; and
selecting the processing manner based on a result of a comparison between the first processing delay and the second processing delay; and
performing an encryption operation or a decryption operation on the to-be-processed data based on the processing manner.

2. The method of claim 1, wherein the data processing request comprises an input address indicating a storage location of the to-be-processed data.

3. The method of claim 1, wherein the data processing request comprises an output address indicating a storage location of an encryption result of the to-be-processed data.

4. The method of claim 1, wherein the data processing request comprises a length indicating the size of the to-be-processed data.

5. The method of claim 1, further comprising:
identifying, during a system startup phase, a location of the encryption/decryption chip and a hardware configuration of the encryption/decryption chip; and
applying for a hardware encryption/decryption resource for the encryption/decryption chip.

6. The method of claim 1, further comprising dividing, in an initialization process, storage space accessible to the central processing unit to obtain a storage area of a preset size, wherein the storage area is used to store the to-be-processed data.

7. The method of claim 1, wherein when the processing manner is the first processing manner, performing the encryption operation or the decryption operation on the to-be-processed data comprises:
dividing the to-be-processed data into multiple fragments; and
performing the encryption operation or the decryption operation on the multiple fragments in parallel using a plurality of processor cores of the encryption/decryption chip.

8. The method of claim 7, wherein dividing the to-be-processed data is based on a hardware processing capability of the encryption/decryption chip.

9. A device comprising:
an encryption/decryption chip; and
a processor configured to:
obtain a data processing request comprising to-be-processed data;
select one of a first processing manner and a second processing manner as a processing manner for the to-be-processed data based on a size of the to-be-processed data and a first parameter, wherein the first processing manner is to be performed by an encryption/decryption chip, wherein the second processing manner is to be performed by a software program running on the processor, wherein the first parameter comprises an encryption delay or a decryption delay generated when a data block of a unit length is processed, and wherein selecting the processing manner comprises:
predict a first processing delay and a second processing delay based on the size of the to-be-processed data and the first parameter, wherein the first parameter further comprises a third processing delay and a fourth processing delay, wherein the third processing delay is generated when the data block is processed using the first processing manner, wherein the fourth processing delay is generated when the data block is processed using the second processing manner, and wherein the first processing delay is generated when the to-be-processed data is processed using the first processing manner, and the second processing delay is generated when the to-be-processed data is processed using the second processing manner; and
select the processing manner based on a result of a comparison between the first processing delay and the second processing delay; and
perform an encryption operation or a decryption operation on the to-be-processed data based on the processing manner.

10. The device of claim 9, wherein the data processing request comprises an input address indicating a storage location of the to-be-processed data.

11. The device of claim 10, wherein the data processing request comprises an output address indicating a storage location of an encryption result of the to-be-processed data.

12. The device of claim 9, wherein the data processing request comprises a length indicating the size of the to-be-processed data.

13. The device of claim 9, when the processing manner is the first processing manner, the encryption/decryption chip is configured to:
divide the to-be-processed data into multiple fragments; and
perform the encryption operation or the decryption operation on the multiple fragments in parallel using a plurality of processor cores of the encryption/decryption chip.

14. The device of claim 13, wherein the encryption/decryption chip is configured to divide the to-be-processed data based on a hardware processing capability of the encryption/decryption chip.

15. A computer program product comprising computer-executable instructions stored on a non-transitory computer-readable storage medium, the computer-executable instructions when executed by a processor of an apparatus, cause the apparatus to:
obtain a data processing request comprising to-be-processed data;
select one of a first processing manner and a second processing manner as a processing manner for the to-be-processed data based on a size of the to-be-processed data and a first parameter, wherein the first processing manner is to be performed by an encryption/decryption chip, wherein and the second processing manner is to be performed by a software program running on the processor, wherein the first parameter comprises an encryption delay or a decryption delay generated when a data block of a unit length is processed, and wherein selecting the processing manner comprises:
predict a first processing delay and a second processing delay based on the size of the to-be-processed data and the first parameter, wherein the first parameter further comprises a third processing delay and a fourth processing delay, wherein the third processing delay is generated when the data block is processed using the first processing manner, wherein the fourth processing delay is generated when the data block is processed using the second processing manner, and wherein the first processing delay is generated when the to-be-processed data is processed using the first processing manner, and the second processing delay is generated when the to-be-processed data is processed using the second processing manner; and
select the processing manner based on a result of a comparison between the first processing delay and the second processing delay; and
perform an encryption operation or a decryption operation on the to-be-processed data based on the processing manner.

16. The computer program product of claim 15, wherein the data processing request comprises an input address indicating a storage location of the to-be-processed data.

17. The computer program product of claim 16, wherein the data processing request comprises an output address indicating a storage location of an encryption result of the to-be-processed data.

18. The computer program product of claim 15, wherein the computer-executable instructions when executed by the processor of the apparatus further causes the apparatus to:
identify, during a system startup phase, a location of the encryption/decryption chip and a hardware configuration of the encryption/decryption chip; and
apply for a hardware encryption/decryption resource for the encryption/decryption chip.

19. The computer program product of claim 15, wherein the computer-executable instructions when executed by the processor of the apparatus further causes the apparatus to:
divide the to-be-processed data into multiple fragments; and
perform the encryption operation or the decryption operation on the multiple fragments in parallel using a plurality of processor cores of the encryption/decryption chip.

20. The computer program product of claim 19, wherein the computer-executable instructions when executed by the processor of the apparatus further causes the apparatus to divide the to-be-processed data based on a hardware processing capability of the encryption/decryption chip.

* * * * *